(12) United States Patent
Sundararaman et al.

(10) Patent No.: US 10,145,411 B2
(45) Date of Patent: Dec. 4, 2018

(54) THRUST WASHERS WITH HYDRODYNAMIC FEATURES

(71) Applicant: Freudenberg-NOK General Partnership, Plymouth, MI (US)

(72) Inventors: Saikrishna Sundararaman, Ann Arbor, MI (US); Raymond L. Szparagowski, Bowling Green, OH (US); Alexander Berdichevsky, Farmington Hills, MI (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 0 days.

(21) Appl. No.: 15/254,030

(22) Filed: Sep. 1, 2016

(65) Prior Publication Data

US 2018/0058499 A1 Mar. 1, 2018

(51) Int. Cl.
*F16C 17/04* (2006.01)
*F16C 17/10* (2006.01)
*F16C 33/10* (2006.01)

(52) U.S. Cl.
CPC .......... *F16C 17/045* (2013.01); *F16C 17/105* (2013.01); *F16C 33/107* (2013.01); *F16C 33/1065* (2013.01); *F16C 33/1075* (2013.01)

(58) Field of Classification Search
CPC .... F16C 17/045; F16C 17/047; F16C 17/105; F16C 33/1065; F16C 33/107; F16C 33/1075

See application file for complete search history.

(56) References Cited

U.S. PATENT DOCUMENTS

| | | | | |
|---|---|---|---|---|
| 2,615,766 A | * | 10/1952 | Wallace | F16C 17/18 29/898.1 |
| 2,872,256 A | * | 2/1959 | Thomson | F16C 33/20 384/420 |

(Continued)

FOREIGN PATENT DOCUMENTS

| | | | |
|---|---|---|---|
| EP | 0402333 A2 | * 12/1990 | ............ F16C 17/047 |
| JP | S57-161318 A | 10/1982 | |

(Continued)

OTHER PUBLICATIONS

Machine Translation of JP 2004-293684 dated Oct. 2004.*

(Continued)

*Primary Examiner* — Alan B Waits
(74) *Attorney, Agent, or Firm* — Daniel J. Sepanik, Esq.; Harness, Dickey & Pierce, P.L.C.

(57) ABSTRACT

A thrust washer includes an annular body with an aperture therein and having a first axial face and a second axial face, an outer diameter edge and an inner diameter edge extending between the first and second axial faces. At least one of the first and second axial or conical faces includes a plurality of recessed grooves extending at least partially between the inner edge and the outer edge and defining un-recessed lands between the recessed grooves. The plurality of recessed grooves defining an average groove width and the plurality of lands defining an average land width between the grooves, wherein a ratio of the groove width to the land width is in a range of 0.2 to 2. The plurality of recessed grooves include a convex lead in surface having a lead in radius.

3 Claims, 5 Drawing Sheets

(56) References Cited

U.S. PATENT DOCUMENTS

| | | | | |
|---|---|---|---|---|
| 3,370,897 A | * | 2/1968 | Rylatt | F16C 17/04 384/368 |
| 3,484,143 A | * | 12/1969 | Sibley | F16C 17/026 384/108 |
| 3,891,282 A | * | 6/1975 | Tuffias | F16C 17/04 384/123 |
| 4,380,355 A | * | 4/1983 | Beardmore | B24B 9/00 384/123 |
| 4,728,201 A | * | 3/1988 | Abbe | F16C 17/045 384/100 |
| 5,554,015 A | * | 9/1996 | Dreiman | F04B 39/0094 384/368 |
| 5,602,945 A | * | 2/1997 | Davis | B02C 2/00 384/368 |
| 5,676,230 A | * | 10/1997 | Awaji | F16C 17/08 192/110 B |
| 5,829,338 A | * | 11/1998 | Chrestoff | F04B 1/148 384/121 |
| 6,024,495 A | * | 2/2000 | Loos | F01D 25/168 384/123 |
| 6,935,849 B2 | * | 8/2005 | Gutknecht | F01D 25/166 384/138 |
| 6,976,788 B2 | * | 12/2005 | Honda | F16C 33/1065 384/123 |
| 7,435,003 B2 | * | 10/2008 | Nakamura | F16C 17/04 384/107 |
| 8,021,105 B2 | * | 9/2011 | Ammann | F01D 25/168 384/123 |
| 8,105,170 B2 | | 1/2012 | Mizuno et al. | |
| 8,231,277 B2 | * | 7/2012 | Morales Espejel | F16C 17/02 384/113 |
| 9,447,819 B2 | * | 9/2016 | Dehne | F16C 17/18 |
| 2001/0005436 A1 | * | 6/2001 | Sjostrom | F16C 33/107 384/123 |
| 2003/0117906 A1 | * | 6/2003 | Rahman | F16C 17/026 369/13.35 |
| 2006/0165325 A1 | * | 7/2006 | Link | F01D 25/168 384/123 |
| 2013/0164128 A1 | * | 6/2013 | Nguyen-Schaefer | F04D 29/063 415/229 |
| 2015/0204377 A1 | * | 7/2015 | Barbosa De Oliveira Ferreira Salles | F16C 9/02 123/197.4 |

FOREIGN PATENT DOCUMENTS

| | | | | |
|---|---|---|---|---|
| JP | 06288411 A | * | 10/1994 | F16C 17/047 |
| JP | 11170397 A | * | 6/1999 | F16C 17/04 |
| JP | 2002-081446 A | | 3/2002 | |
| JP | 2004293684 A | * | 10/2004 | |
| JP | 2008261474 A | * | 10/2008 | F16C 17/047 |
| JP | 2015-075225 A | | 4/2015 | |
| JP | 2015-158212 A | | 9/2015 | |
| WO | 2016/063340 A1 | | 4/2016 | |

OTHER PUBLICATIONS

Machine Translation of JP-06288411 (Year: 1994).*
"Development of Low Friction Washer for AT-CVT (Torque Converter)"; Seki et al, NOK Corporation, SAE International © 2007; Publication No. 2007-01-0573 (5 pages).
European Search Report dated Jan. 19, 2018 (corresponding to EP17186172.7).

* cited by examiner

SCHEMATIC OF A
SYMMETRIC GROOVE

THRUST WASHERS WITH HYDRODYNAMIC FEATURES

FIELD

The present disclosure relates to thrust washers and more particularly, to thrust washers with hydrodynamic features.

BACKGROUND AND SUMMARY

This section provides background information related to the present disclosure which is not necessarily prior art.

Thrust washers fail due to loss of lubrication and high interface temperature conditions. This present disclosure uses improved groove features to improve the ability to form thin lubricant films. The features allow better film generation and thereby lower friction and interface temperature. These features allow for use of very low lubrication conditions as they more effectively use the lubricant than conventional groove geometries. The result of these new designs allows them to be used in more aggressive speed and pressure applications while also reducing the torque compared to designs used today.

The present disclosure is directed to a thrust bearing made from a thermoplastic or thermoset material manufactured using machining or plastic molding techniques. The washer has grooves or partial grooves with the geometric features designed to promote a fluid flow under washer and generate/retain fluid film to support thrust forces and rotational speeds. This results in the washer running at lower friction as it rides on the fluid film generated by the design features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
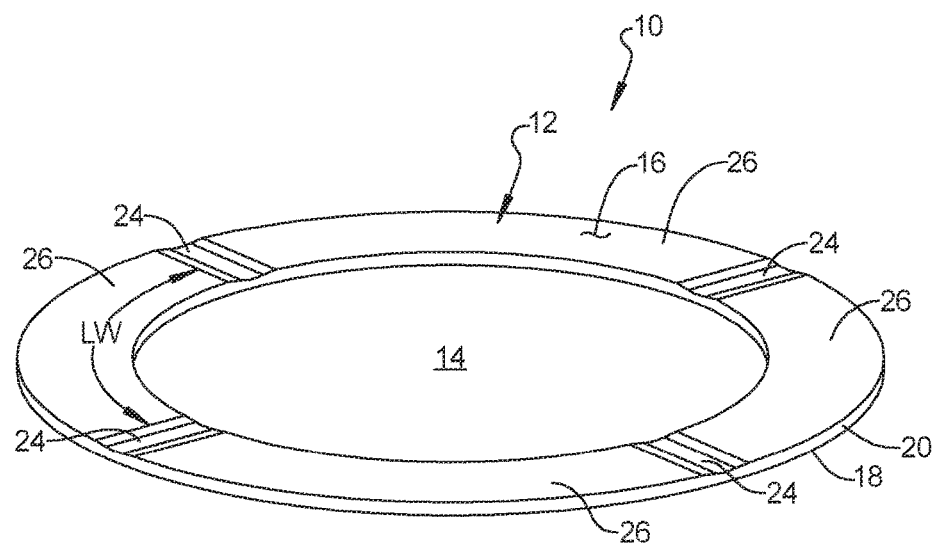
FIG. 1 is a perspective view of a thrust washer having hydrodynamic features according to a first embodiment.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 8:
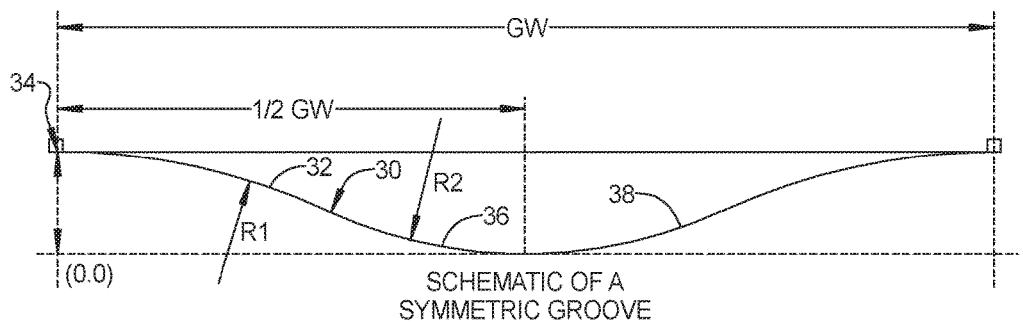
FIG. 8 is a schematic view of a hydrodynamic feature according to the first embodiment.

With reference to FIGS. 1 and 8, a thrust washer 10 is shown including an annular body 12 with an aperture 14 therein. The annular body 12 has a first axial face 16 and a second axial face 18 along with an outer diameter edge 20 and in inner diameter edge 22 extending between the first and second axial faces 16, 18. At least one of the axial faces 16, 18 can include a plurality of recessed grooves 24 extending from the inner diameter edge 22 to the outer diameter edge 20, as shown in the axial face 16. The axial face 16 includes a plurality of lands 26 disposed between the recessed grooves 24. In the embodiment shown in FIG. 1, four recessed grooves 24 and four lands 26 are provided on the axial face 16. Although the embodiment of FIG. 1 shows four recessed grooves 24 and four lands 26, it should be understood that a greater or fewer number of recessed grooves 24 and lands 26 can be provided such as for example the thrust washer 10' shown in FIG. 2, where twelve recessed grooves 24 and twelve lands 26 are shown. The plurality of recessed grooves 24 can be equally spaced and should include a minimum of two or more recessed grooves 24. The number of grooves affects fluid film formation, thrust force capacity and torque resulting from fluid shear.

With reference to FIGS. 1 and 8, each of the recessed grooves 24 has an average groove width (GW) and each of the lands 26 has an average land width (LW, see FIG. 1). A ratio of groove width (GW) to land width (LW) affects hydrodynamic thrust force carrying capacity of the thrust washer 10. According to a preferred aspect of the present disclosure it has been discovered that designs having a groove width to land width ratio (GW/LW) in a range of 0.1 to 2 have been found to provide a high thrust force carrying capacity and low torque.

Figure 9:
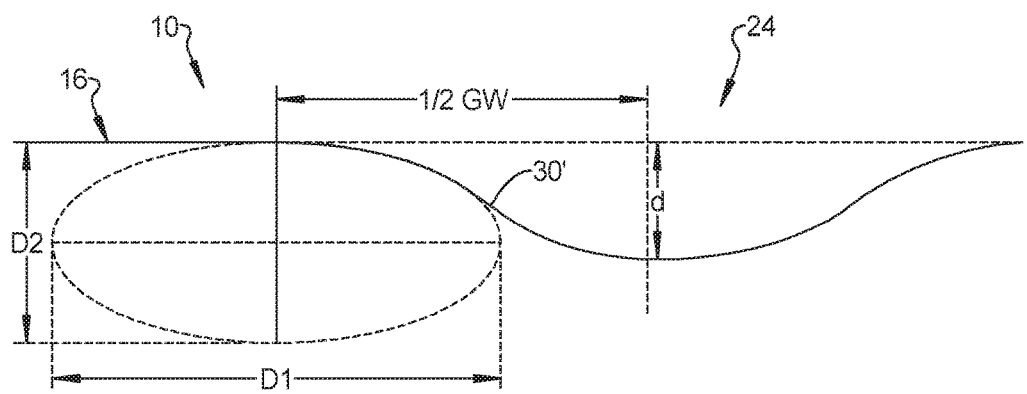
FIG. 9 is a schematic view of a hydrodynamic feature having an elliptical lead in surface.

With reference to FIG. 8, the plurality of grooves 24 include a lead-in surface 30 having a convex surface 32 defining a lead in radius R1 to generate fluid pressure at the groove inlet 34 and promote formation of a fluid film under the thrust washer along the lands 26. The lead in radius R1 is preferably between 2 mm to 200 mm and more preferably between 2 mm to 50 mm. The lead-in surface 30' can have an elliptical geometry (FIG. 9) with the major diameter of the ellipse defined by D1 and the minor diameter of the ellipse defined by D2. The elliptical geometry can generate more pressure and create larger fluid film thicknesses. A ratio of the major diameter, D1 to the minor diameter, D2 is preferably in the range of 1.5:1 to 30:1 and more preferably 1.5:1 to 10:1. It has been discovered that the elliptical geometry generates more pressure and creates larger fluid film thicknesses.

With continued reference to FIG. 8, the plurality of recessed grooves include a groove depth d in a range of 0.05 mm to 2 mm and preferably in a range of 0.05 mm to 1 mm. FIG. 3 shows the recessed grooves 24 with a shallow depth d as compared to the embodiment of FIG. 2. The recessed groove can be provided with a reducing depth d from the inside diameter to the outside diameter or with reducing depth d from the outside diameter to the inside diameter.

Figure 7:
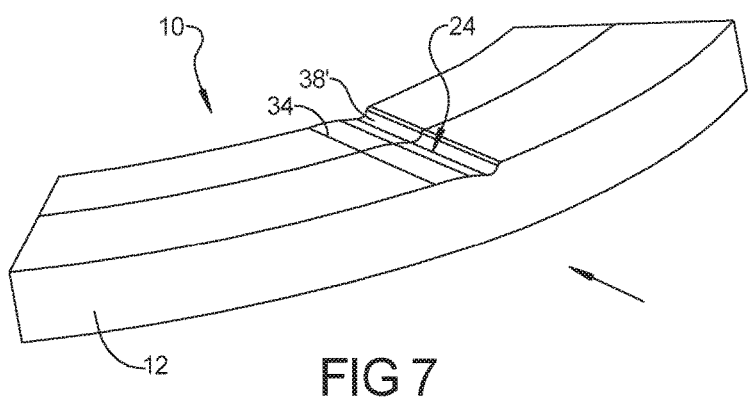
FIG. 7 is a detailed perspective view of a hydrodynamic feature of a thrust washer according to a seventh embodiment.

It should be noted that the groove inlet 34 defines a lead in radius that promotes the formation of a fluid film under the thrust washer 10 along the lands 26 as an opposing surface bears against the thrust washer 10 and relative rotation occurs between the opposing surface and thrust washer 10. Each of the plurality of grooves 24 also include a back groove portion 38 that can include various alternative geometries that are not intended to be the subject of this disclosure. By way of example only, the geometry of the back groove portion 38 can include a symmetrical elliptical geometry as illustrated in FIG. 8 or can include a non-symmetrical geometry such as stepped back groove portions 38' as illustrated in FIG. 7.

Figure 2:
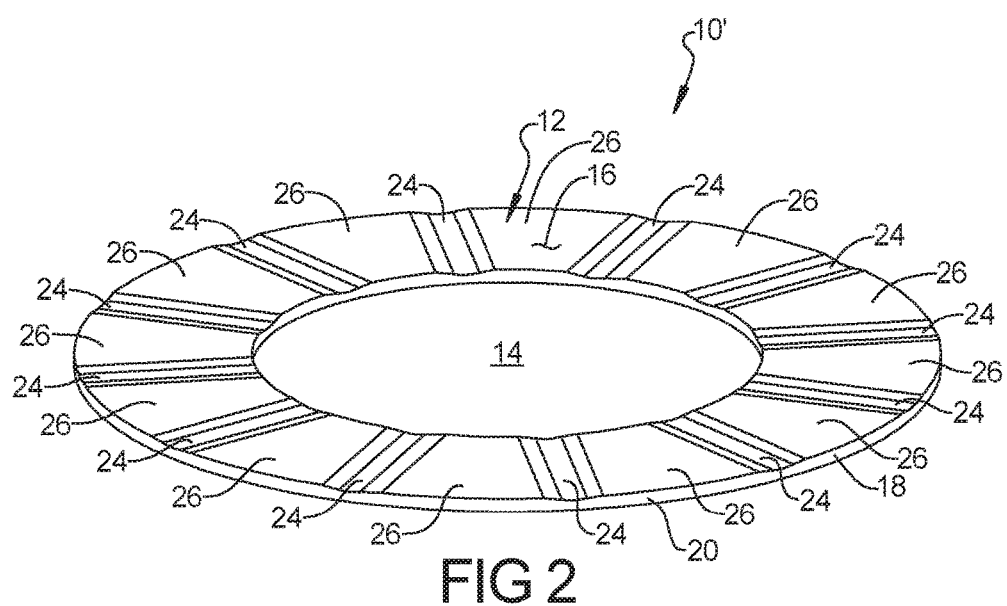
FIG. 2 is a perspective view of a thrust washer having hydrodynamic features according to a second embodiment.
Figure 3:
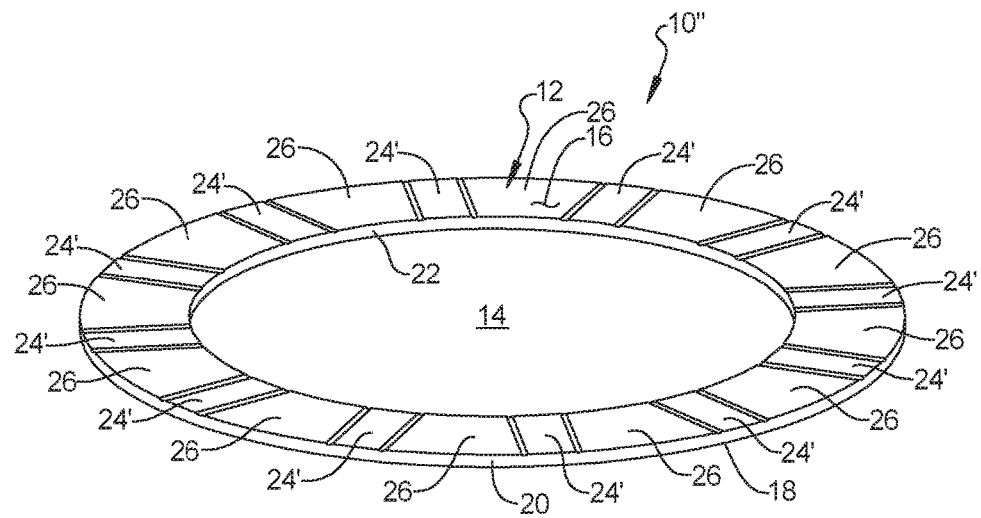
FIG. 3 is a perspective view of a thrust washer having hydrodynamic features according to a third embodiment.
Figure 4:
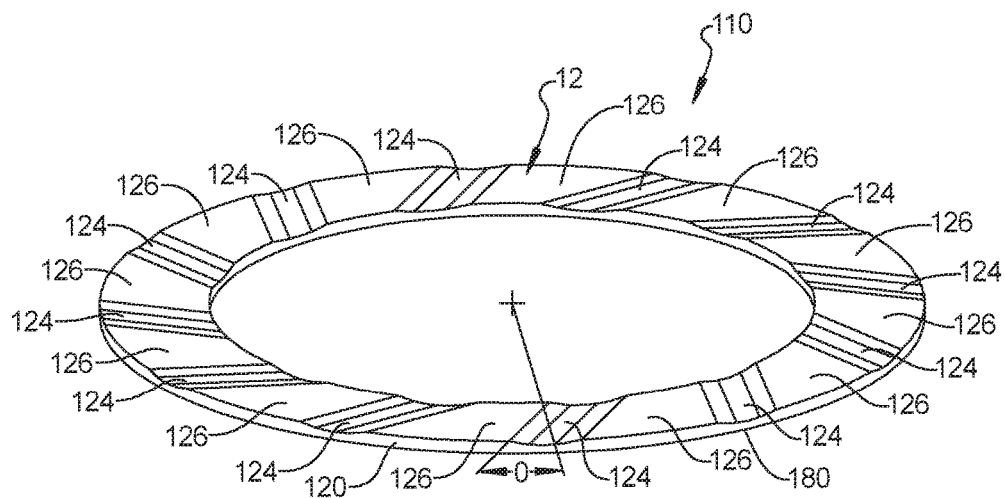
FIG. 4 is a perspective view of a thrust washer having hydrodynamic features according to a fourth embodiment.

In the embodiments of FIGS. 1-3, the recessed grooves 24 are radially extending and are of generally equal width along their entire length. Alternatively, as shown in FIG. 4, the thrust washer 110 can include grooves 124 that can be angled so as not to be radially extending, but instead are angularly offset relative to the center axis X. The angled recessed grooves 124 can be formed with an elliptical geometry that leads into the lands 126 in the same manner as the grooves 24 as discussed above. The groove angles α with the radial direction through the center axis can range from between −89° to 89° and more preferably from between −60° to 60°.

Figure 5:
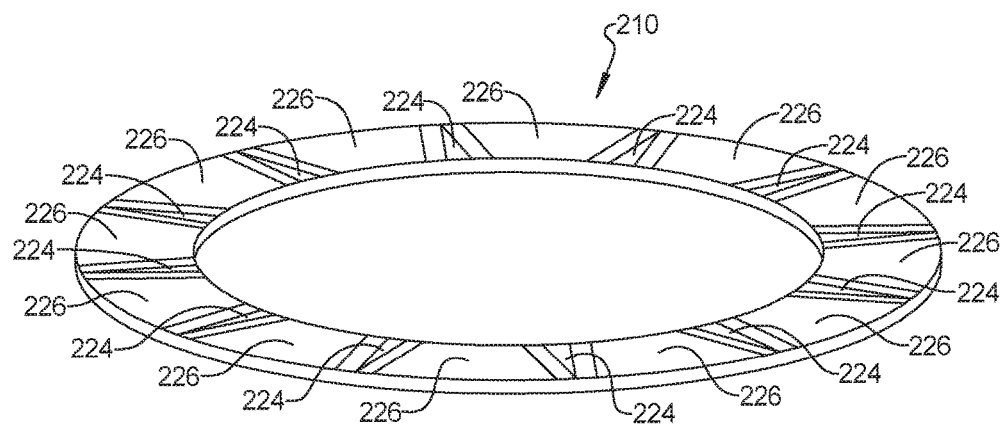
FIG. 5 is a perspective view of a thrust washer having hydrodynamic features according to a fifth embodiment.

With reference to FIG. 5, the thrust washer 210 can include recessed grooves 224 that can be tapered so as to have a wider width at one end and a narrower width at another. In the embodiment shown in FIG. 5, the recessed grooves 224 are tapered so as to become narrower as the recessed grooves 224 extend radially outward (i.e. narrower at the outside diameter). Alternatively, the recessed grooves could taper in the opposite direction so that they become wider in the radially outward direction (i.e. wider at the outside diameter). The recessed grooves 224 can be formed with an elliptical geometry that leads into the lands 226.

Figure 6:
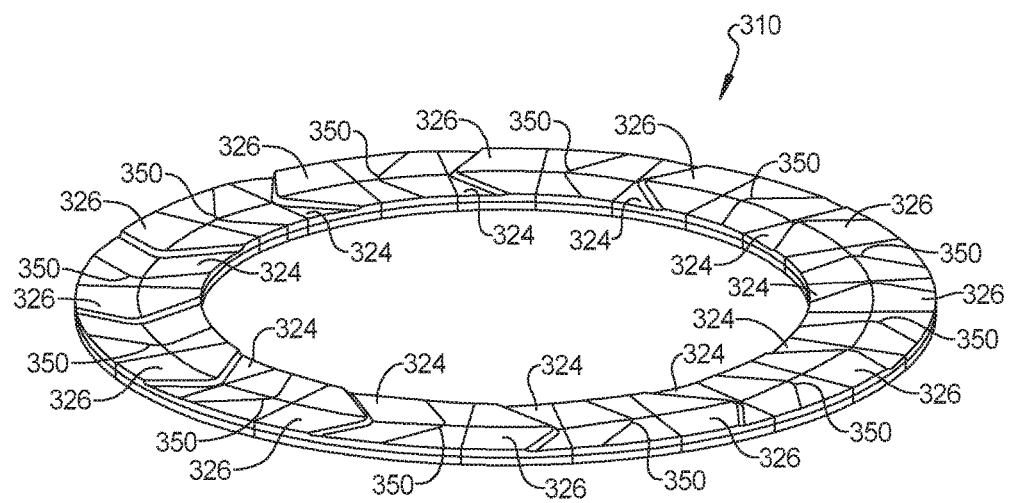
FIG. 6 is a perspective view of a thrust washer having hydrodynamic features according to a sixth embodiment.

With reference to FIG. 6, the thrust washer 310 can include recessed grooves 324 that can be formed with as V-shape for pulling the fluid to a center region 350 of the axial face 316 so as to funnel and introduce the fluid along a radiused lead in surface 330 with a stronger force at the center region 350. The recessed V-shaped grooves 324 can be formed with an elliptical geometry that leads into the lands 326.

Figure 10:
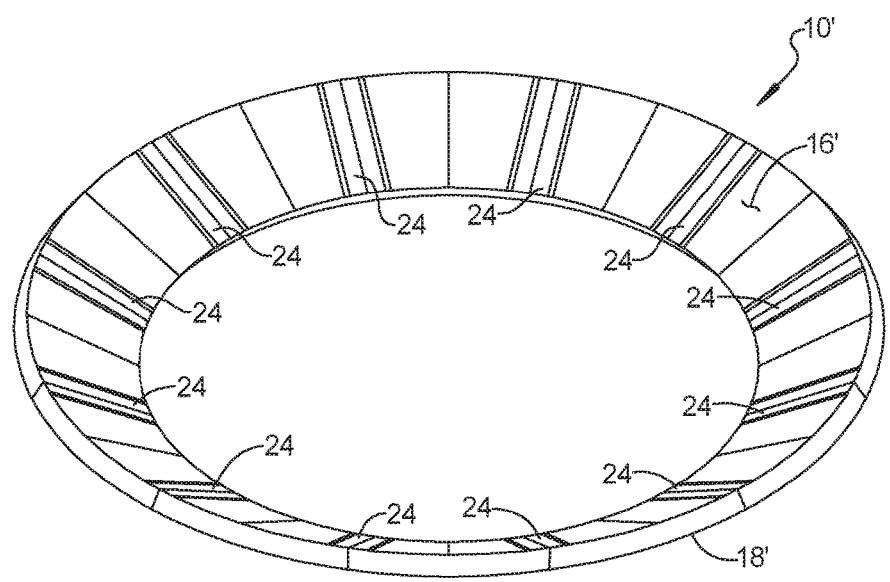
FIG. 10 is a perspective view of a conical thrust washer having hydrodynamic features according to principles of the present disclosure.

With reference to FIG. 10, the thrust washer 10' can be conical in shape and include a conical first face 16' and a conical second face 18' with at least one of the faces including a plurality of grooves 24 as disclosed herein.

The thrust washer 10, 110, 210, 310 can be made from engineering plastic materials including thermoplastics, thermosets, or combinations of both or metals, ceramics or other known thrust washer materials. The thrust washer can include the recessed grooves as disclosed on only one axial face 16 or on both axial faces 16, 18. When the grooves 24 are provided on both faces, the grooves on each face can be offset to each other. When the grooves 24 are provided on both faces, the grooves on each face can be aligned with each other. In addition, it should be understood that a partial groove can be used that is closed on either the inside diameter or the outside diameter so that the grooves do not extend across the entire axial face 16, 18. In addition, the recessed grooves 24 can have a portion that breaks through an entire thickness of the thrust washer for communicating lubricant there through. In addition, the thrust washer can be provided with a combination of the different types of recessed grooves disclosed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thrust washer, comprising:
an annular body with an aperture therein and having a first axial face and a second axial face, an outer edge and an inner edge extending between the first and second axial faces, wherein at least one of the first and second axial faces includes a plurality of recessed grooves extending between the inner edge and the outer edge and defining un-recessed lands there between with the plurality of recessed grooves defining a groove width and the plurality of lands defining an average land width between the grooves, wherein a ratio of the groove width to the land width is in a range of 0.1 to 2, wherein opposite side edges of said plurality of recessed grooves are symmetrical in shape and each include a convex lead in surface, wherein the convex lead in surface of the plurality of recessed grooves have an elliptical geometry with a ratio of a major diameter to a minor diameter in a range of 1.5:1 to 10:1, wherein the plurality of recessed grooves have a depth in a range of 0.05 to 1 mm.

2. The thrust washer according to claim 1, wherein only one of the first and second axial faces includes a plurality of recessed grooves.

3. The thrust washer according to claim 1, wherein each of the first and second axial faces includes a plurality of recessed grooves.

* * * * *